Oct. 8, 1940.  A. L. BROWNE  2,216,873
STORAGE BOX
Filed Feb. 16, 1937   3 Sheets-Sheet 1
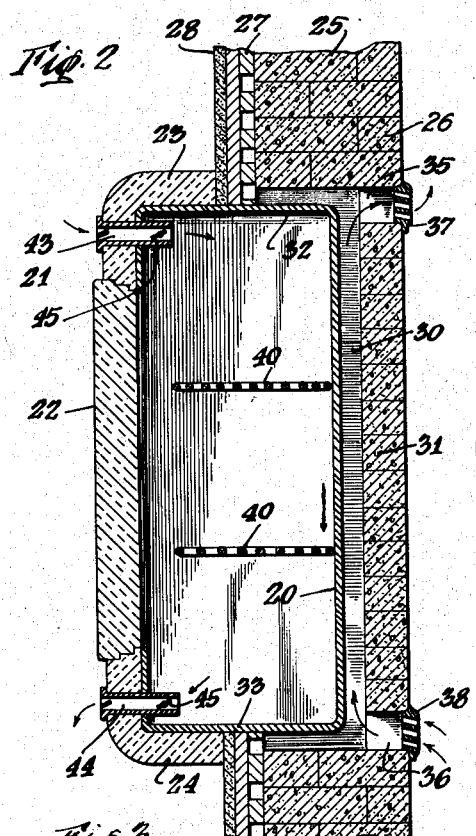
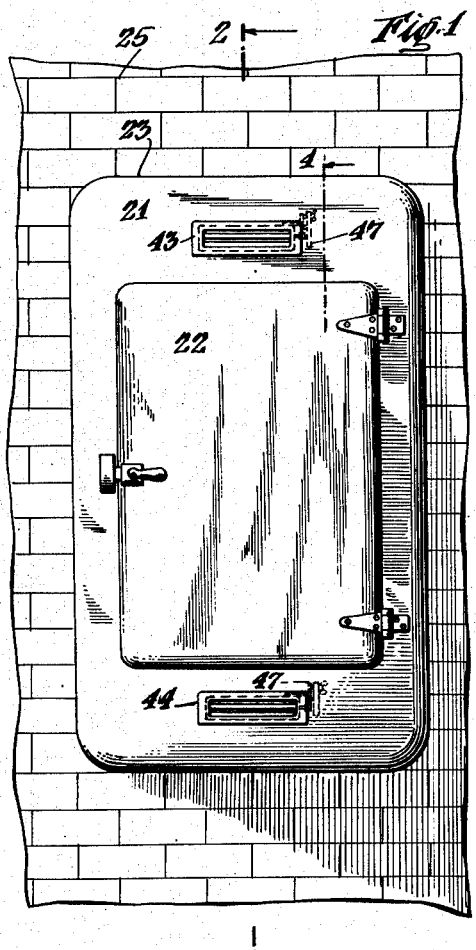
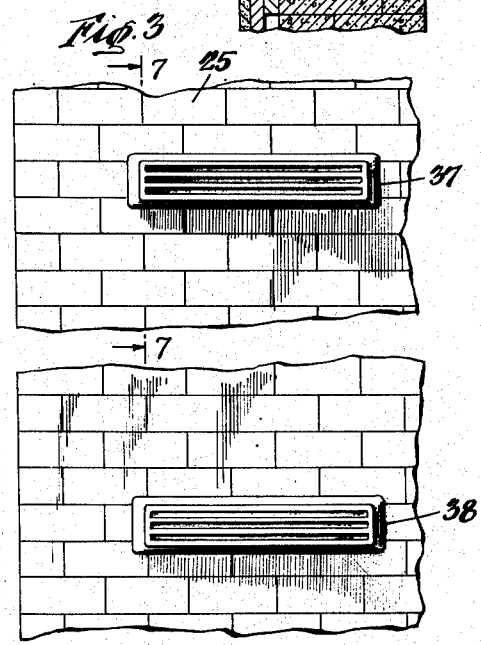
INVENTOR
Alfred L. Browne
BY
Cooper, Kent & Dunham
ATTORNEYS Oct. 8, 1940.   A. L. BROWNE   2,216,873
STORAGE BOX
Filed Feb. 16, 1937   3 Sheets-Sheet 2
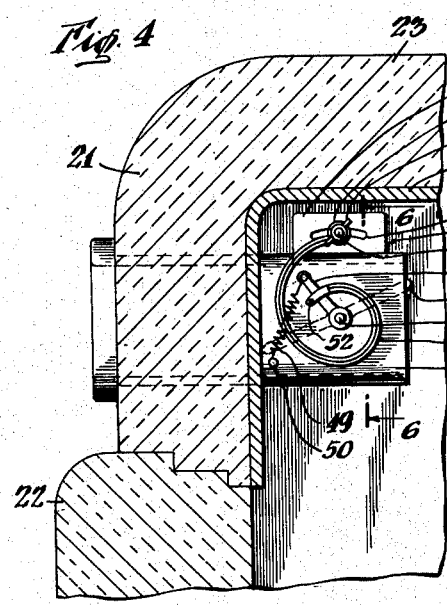
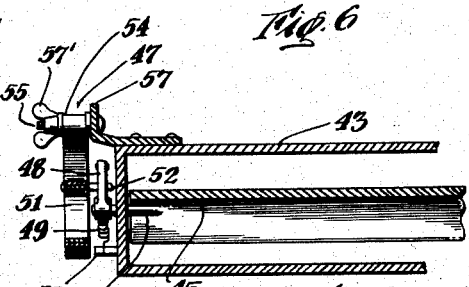
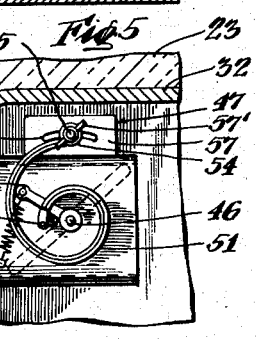
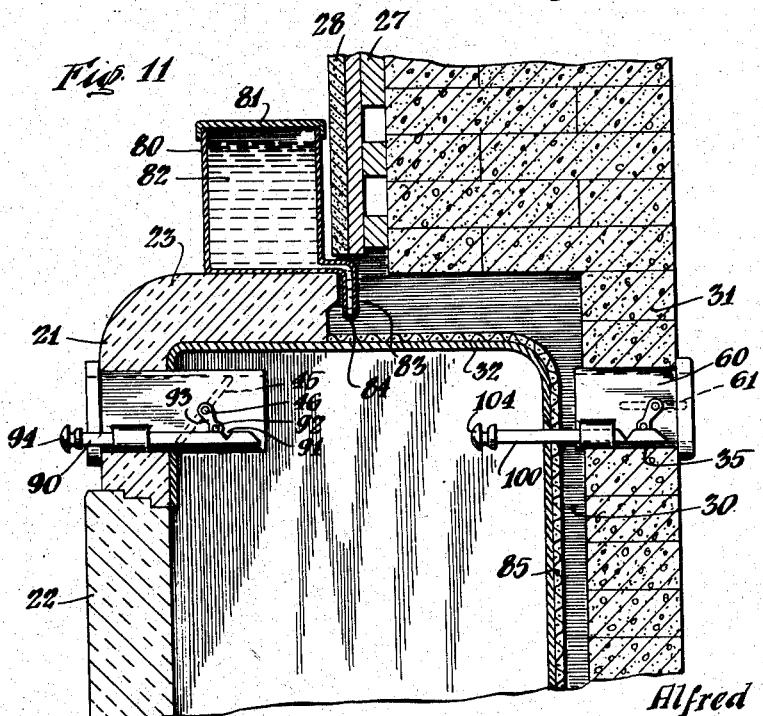
INVENTOR
*Alfred L. Browne*
BY
*Cooper, Kent & Dunham*
ATTORNEYS Oct. 8, 1940.  A. L. BROWNE  2,216,873
STORAGE BOX
Filed Feb. 16, 1937  3 Sheets-Sheet 3
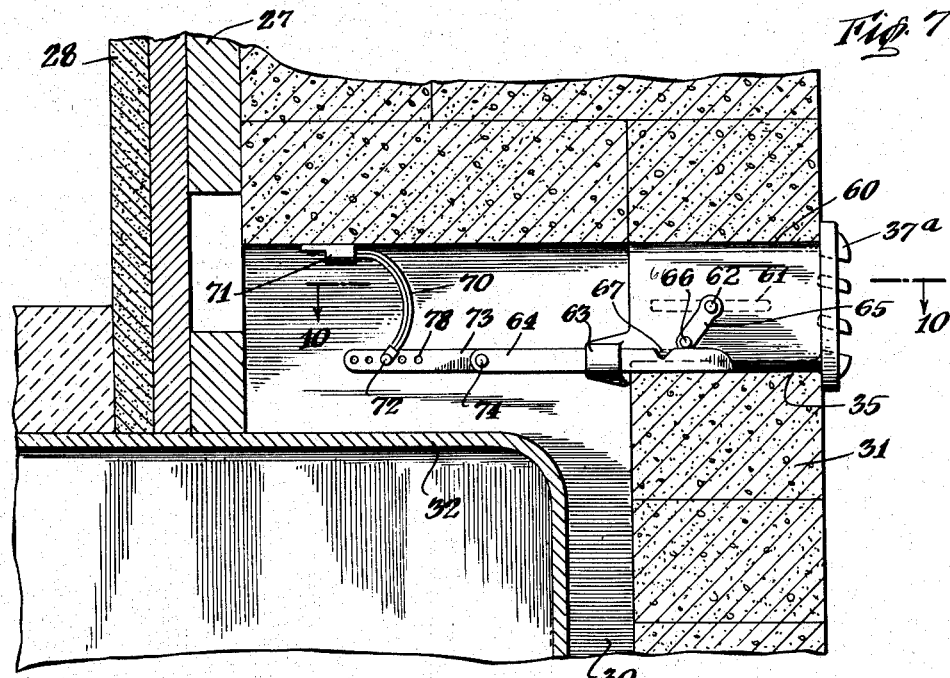
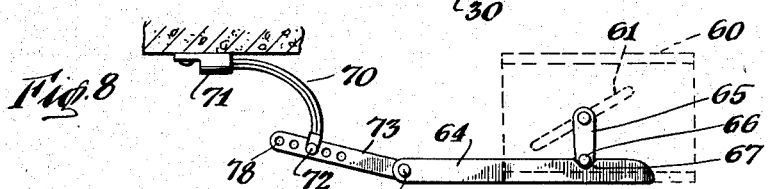
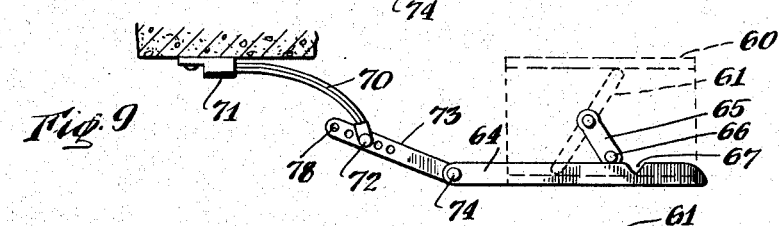
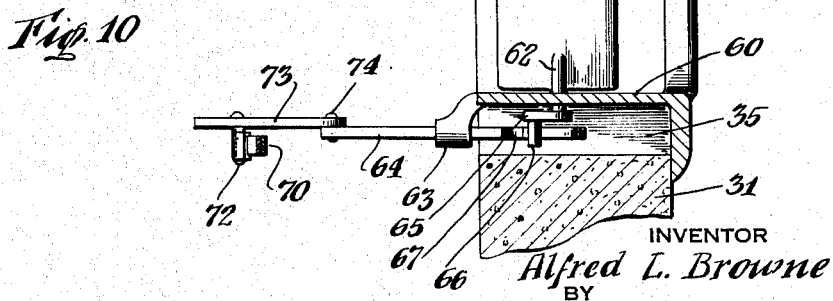
INVENTOR
Alfred L. Browne
BY
Cooper, Kerr + Dunham
ATTORNEYS Patented Oct. 8, 1940

2,216,873

UNITED STATES PATENT OFFICE 2,216,873

STORAGE BOX

Alfred L. Browne, South Orange, N. J.

Application February 16, 1937, Serial No. 125,954

4 Claims. (Cl. 20—1.11)

This invention relates to a storage box, and more particularly to boxes or cabinets which are mounted in the wall of a building, and cooled by the outside air during the cold seasons of the year, for the preservation of articles of foods or the like stored in the box.

An important object of the invention is to provide a storage box of the character described, which can be conveniently mounted in the wall of a dwelling or apartment, and which, although subjected to the cooling action of the outside air, can be regulated or controlled so as to keep the temperature inside the box from dropping below a predetermined point. A further object of the invention is to provide such storage box, which is simple and inexpensive yet particularly efficient in keeping the enclosed articles at a desirably low temperature, and which includes thermally-responsive means for automatically keeping the temperature at or above a predetermined minimum.

It may be explained, for example, that while it is important to have a reduced temperature for the proper preservation of most foods, such as fruits, vegetables, beverages, cheese, cooked meats, roast fowl, and the like, it is generally undesirable to keep such articles of food at very low temperatures,—because the food is likely to freeze, and also because the lower the temperature, the greater the dehydrating or drying action of the air on the food itself. For most purposes, foods are best stored at a temperature between 40° and 55° F., a temperature of about 48° to 50° F. being generally preferable; at such temperatures, freezing is not only avoided but the air can be made to retain sufficient moisture so that the food will not dry out appreciably, and can be kept fresh and palatable for a very considerable time. Indeed, refrigerators and iceboxes are ordinarily constructed so as to maintain a temperature of the order last stated, in the food storage chamber; but particularly in electrically operated or other mechanical refrigerators, the cooling elements themselves must ordinarily have a much lower temperature (usually considerably below freezing) than the range mentioned, both to provide for the freezing of ice cubes or the like, and to conserve the space occupied by the cooling element. The result, however, is that as the air circulates past the low-temperature cooling element, it is very much dehydrated, the water condensing and freezing on the cooling element, and the relative humidity of the entire box interior is greatly reduced. In consequence, many articles of food, particularly those which cannot be conveniently kept in tightly closed containers (such as cooked meats, bulky green vegetables or fruits, and the like) dry out quickly.

Accordingly, a further object of the present invention is to provide a storage box of the character previously described, wherein the temperature may not only be maintained at a level otherwise satisfactory for the preservation of food, but wherein the humidity of the air inside the box can be kept at a relatively high figure, to obviate or reduce the dehydration of the food. As will be hereinafter apparent, the storage box of the present invention is notably adapted to supplement (or in some instances to replace) the usual home refrigerator, and thus to provide, especially in small apartments or dwellings where the ordinary refrigerator is necessarily small, a supplementary storage place particularly advantageous for storing easily dried foods of the kind mentioned above.

Other objects of the invention include provision of storage boxes: wherein means are provided, preferably automatic in response to the temperature of the box, for warming the interior of the latter to keep it from cooling below a predetermined point; wherein means are provided, also preferably automatic, for interrupting the cooling action of the outside air when the aforesaid warming action may not properly serve to maintain the desired temperature (as in particularly cold localities); wherein the cooling action and other objects can be effectively obtained without admitting the outside air to the interior of the box, and without substantial effect on the structure or appearance of the outside of the building wall; and wherein the interior of the box may be simply and effectively maintained at a usefully reduced temperature during warm weather.

Other objects and advantages include those hereinafter stated or apparent in connection with the following description of certain presently-preferred embodiments of the invention, such embodiments being illustrated in the drawings, in which Figure 1 is a front elevation of the box;

Fig. 2 is a vertical section, on line 2—2 of Figure 1, showing the box mounted in the wall of a house;

Fig. 3 is an elevation of the outside house wall, looking from the right in Figure 2;

Fig. 4 is an enlarged fragmentary sectional view of the upper inside corner of the box, taken on the line 4 of Figure 1;

Fig. 5 is a like view of part of Figure 4, with certain elements in different position;

Fig. 6 is a vertical section taken on line 6—6 of Figure 4;

Fig. 7 is an enlarged fragmentary vertical section of a somewhat modified construction, seen as if taken on the line 7—7 of Figure 3;

Figs. 8 and 9 show, in the same way, certain instrumentalities of Figure 7, with the elements in respectively differing positions;

Fig. 10 is a fragmentary horizontal section on the line 10 of Figure 7; and

Fig. 11 is an enlarged vertical view, generally in section corresponding to Figure 2, showing other structural modifications.

Referring to Figures 1 and 2, the storage box has an outside or rear wall 20 of sheet metal or like heat-conducting material, and an inside or front wall 21 which is of heat-insulating material and which is provided with a door 22, likewise of insulating material, for access to the interior of the box. The insulating construction of the front wall 21 and its door 22 may be conveniently the same as that employed in better types of refrigerators, and it will be appreciated that the insulating front wall includes, so to speak, the inward half of the top and bottom of the box, at 23, 24—the box being, in the embodiment here shown, conveniently mounted so that it is recessed or embedded about halfway into the wall of the building, generally designated 25. The wall 25, which will usually be of brick, frame or concrete construction, is here shown to include brickwork 26, interior lath 27, and interior finishing layers 28.

The recess provided in the wall 25 for the rear side of the box is conveniently somewhat larger than the latter, particularly along the vertical part of the rear of the box, and to like advantage, at the top and bottom, as shown. In this way there is provided an air space 30, adjacent and coextensive with the rear wall 20 of the box, and separated from the outside by the intervening wall of brickwork 31, which forms a portion of the building wall brickwork 26. As shown, the air space 30 may also extend over the top and bottom portions of the box which are embedded in the building wall, these top and bottom portions 32, 33 being in effect extensions of the sheet metal wall 20; indeed, at least for structural rigidity, the sheet metal may extend around inside the box and inside its front insulated wall, as shown in Figure 2. The air space 30 communicates with the out-door air through horizontally wide conduits 35, 36, through the brickwork, these conduits being respectively disposed near the top and bottom of the box. Means may be provided to prevent the ingress of rain, leaves, or other objects to the air space 30, such means being here illustrated as the grilles 37, 38 (respectively associated with the conduits or passages 35, 36).

The interior of the box may be provided with suitable shelves 40, conveniently removable and of screen-like or other apertured construction for free circulation of air,—for example, shelves of the type generally used in ordinary refrigerators.

Near the top and bottom of the inner or front side of the box, and conveniently directly above and below the door 22, respectively, there are provided conduits 43, 44, each having a suitable grille or the like at the front, and each adapted to conduct air between the inside of the box and the interior of the house. Each of these conduits is provided with a damper or valve comprising a vane 45 rotatable on horizontal shafts 46, and adapted to close the corresponding conduit against passage of air through it.

Figures 4 to 6 inclusive show, on an enlarged scale, convenient means for automatically operating each damper in accordance with the temperature of the box; it being appreciated that the arrangement shown in these figures, although directly illustrated in connection with conduit 43, is applied to each of conduits 43 and 44, as indicated by the dotted line structures generally designated 47, 47, in Figure 1. As previously stated, the damper 45 is carried by shafts 46 which are journalled in the sides of the conduit 43, so that the damper 45 is adapted to rotate from a closed position, as shown in dotted lines in Figure 5, to an open position as similarly shown in Figure 4, or vice versa. At one side of the conduit 43, shaft 46 has mounted on it, for rotation therewith, an arm 48, which at its outer end is connected to a coil spring 49, in turn connected at its further end to a pin or other suitable support 50 on the side of the conduit 43; the arrangement being such that the spring 49 naturally tends to contract and thus to pull the arm 48 down, and in consequence to rotate the damper 45 into closed position, as shown in Figure 5. A thermostatic element comprising a bi-metallic coil or spiral 51 is mounted adjacent the side of the conduit, and has projecting horizontally from its inner end a pin 52, in the path of the member 48. With the specific arrangement shown, the bi-metallic spiral, which has its upper or outer end securely mounted against rotation, should be such that as the temperature rises, the spiral tends to curl up, and thus, by virtue of the disposition of the spiral relative to the shaft 46, tends to move the pin 52 in a counterclockwise direction as seen in Figures 4 and 5. Thus when the temperature of the box interior is relatively warm, the spiral is relatively tightly curled, as shown in Figure 5. The pin 52 is thus out of engagement with the arm 48, and the latter, by virtue of the spring 49, keeps the damper 45 closed. On the other hand, when and as the temperature goes down, the spiral uncurls and rotates the pin 52 in a clockwise direction about the axis of the shaft 46. Upon reaching a certain point, which may correspond to the minimum temperature desired in the box, the pin 52 engages the side of the arm 48, and subsequent uncurling of the spiral 51, occasioned by further reduction in temperature, will then, through the instrumentality of the pin 52 pushing against the arm 48, rotate the damper 45 into open position, for example as shown in Figures 4 and 6.

The upper or outer end of the spiral 51, which, as previously explained, should be rigidly mounted against rotation, has a mounting member 54 carried by a bolt 55 passing through an arcuate slot 56 in a mounting plate 57 carried by the upper part of the conduit 43. The arcuate slot is conveniently arranged to conform to the arc of a circle about the axis of the shaft 46, and it will now be seen that by moving the mounting member 54 one way or the other along this slot, and thereafter tightening the thumb screw 57 to secure the member in place, adjustment may be effectively made of the degree of temperature at which the bi-metallic member 51 will open the damper 45. For example, if the member 54 is moved to the right, as seen in Figure 4, the damper will be opened at a higher temperature, and likewise if the member 54 is moved to the left, and there secured in position, the strip 51 may uncurl considerably more before pin 52 strikes arm 48, so that the damper 45 does not open until a lower temperature is reached.

It will now be seen that by virtue of the construction shown and described, and with the box mounted in the wall, the cold air from out-doors circulates along and around the rear wall 20 of the box (including the top and bottom portions thereof 32, 33),—the circulation, in general, being inwardly through duct 36 and up along the passage 30 and out through duct 35,— and by virtue of the resulting heat exchange, the interior of the box is cooled. Assuming that each of the dampers 45 in the conduits 43, 44 (being normally closed, as explained in connection with Figures 4 to 6 inclusive) has its thermostatic member 51 arranged to open the damper when the temperature of the box drops below, say 45°, then if the outside temperature is substantially below that figure, the interior of the box will eventually tend to drop, in temperature, to a correspondingly low figure. As the temperature 45° F. is passed, however, the thermostatic members open the dampers 45, effecting a flow of warm air from the inside of the house, generally inward through conduit 43, down through the box, and out through conduit 44 at the bottom, thus warming the inside of the box. Manifestly, as soon as the inside of the box is thus warmed up to the predetermined minimum of 45° F., the thermostatic devices again close the dampers 45, and the cooling action occasioned by the circulation of the outside air, through the passage 30 and along the outside of the rear wall 20, continues.

In other words, it will be seen that the arrangement is such as to maintain a temperature in the box which never drops substantially below a predetermined minimum, which as pointed out hereinabove, may be the desired temperature for the preservation of the various kinds of food to be stored in the box. It will also be appreciated that the air inside the box, particularly by virtue of the initial evaporation from the food therein, has and maintains a high relative humidity. The actual temperature inside the box is kept above a point at which the humidity would necessarily so decrease as to dry out the food, and there is no cooling element of the sort present in the ordinary mechanical refrigerator, to dry out the air. Likewise, with the preferred construction shown, excluding the outside air from the interior of the box, there is no reduction of humidity due to substitution of outside air which may be dry because of its low temperature; furthermore, the warming action of the air which may be admitted from time to time through the conduits 43, 44, is such as to warm not only the interior of the box but the interior side of the wall 20 itself,—so that the wall 20 (which, by virtue of its size and location, effects a rapid heat exchange with the entire box interior) generally lacks the previously described dehydrating effect of the cooling element in the ordinary mechanical refrigerators.

In some cases, particularly where the apparatus is to be used in extremely cold localities, or localities where very low or even sub-zero temperature may be encountered from time to time, the apparatus may also include arrangements of the character shown in Figures 7 to 10 inclusive, viz., thermostatically controlled means for shutting off the supply of outside air to the cooling passage 30. Although Figure 7 shows the apparatus in connection with the upper conduit or passage 35, it will be understood that like structure is embodied at the same time in connection with the lower conduit or passage 36.

The passage 35, as seen in Figure 7, may be lined with a metal conduit member 60, terminating at its outer end in the grille 37a, and within this conduit 30 there is mounted a damper 61, carried by shafts 62, and of construction similar to that of the dampers 45. Slidably retained by a supporting sleeve 63 extending from the wall of the conduit 60 (see also Figure 10), an arm or blade 64 is arranged to move lengthwise of itself along the side of the conduit 60. An arm 65 is secured to the outer end of shaft 62 to rotate with it, on the same side of the conduit 60, and carries at its lower extremity an outwardly projecting horizontal roller 66, arranged to travel on the upper surface of the arm or blade 64. In the latter there is a notch 67, extending down from its upper surface, and adapted to receive the roller 66, as the blade 64 is moved along under it (so that the roller then drops into the notch),—the notch 67 being deep enough to permit rotation of the arm 65 (with shaft 62) as the blade 64 moves past with the roller in its notch.

The open area above the top portion 32 of the box is here somewhat higher than in the arrangemnet of Figure 2, to accommodate a thermostatic member comprising a bimetallic strip 70, secured at its upper end in a mounting 71 fastened to the brickwork. The lower end of the member 70 carries a horizontal pin 72 which is pivoted in an appropriate hole in a link member 73, the link member being in turn pivoted at 74 to the inner extremity of the arm or blade 64. The bimetallic strip 70 being such that it will uncurl as the temperature drops, and curl up as the temperature rises, it will be seen that when the outside temperature is relatively warm,—say 30° F. or more,—the link 73 and arm 64 are maintained in the position shown in Figure 7, viz., with the roller 66 resting on the outer end of the arm 64, and the damper 61 in correspondingly open position. As the temperature drops, the member 70 uncurls, and through the connection of the link 73, pushes the arm 64 to the right, so that the roller 66 eventually drops into the notch 67, as shown in Figure 8, and the arm 65 is moved counter-clockwise about the axis of shaft 62.

This movement of the parts continues, with continuing uncurling of the thermostatic member 70, until the roller 66 has ridden up out of the notch and onto the rear portion of the arm 64, and the damper 61 has thereby been rotated into closed position. Thus when the temperature drops to a very low point, the instrumentalities just described (including identical means at the lower outside-air conduit 36) serve to close the conduits 35, 36, against circulation of outside air through the space 30. If, on the other hand, the temperature again rises, the thermostatic member 70 will again curl up, withdrawing the arm 67, and rotating the damper 61 back to its open position.

In order to provide for adjustment of the temperature-responsive means just described, the link 73 may be provided with a plurality of holes 78, in which the pin 72 may be selectively pivoted, and it will thus be seen that the temperature at which the damper will begin to close may be raised or lowered by shifting the pin 72 to the left or right, respectively, on the member 73.

Although the described apparatus is particularly useful during cold weather, when the temperature of the out-side air may be such as to cool the box to an average of 50° or less, and although the box may also be used simply as a closed storage cabinet during warm seasons, the arrangement shown in Figure 11 provides for more efficient use of the box during the warmer periods. Above the box, and conveniently resting on the upper surface of the top portion 28, there is disposed a tank 80, having a removable cover 81, and adapted to be filled with water 82, and having a drain 83. The drain 83, which extends down toward the exposed metal top portion 32, inside the building wall, as shown, has a constricted or metering orifice 84, for effecting the passage of a minute flow of water. The outer surface of the rear wall 20, including its upper portion 32, is covered with water-absorbent material 85, which may comprise, for example, several layers of burlap or like absorbent fabric. The water thus runs very slowly out of the tank 80, through the restricted orifice 84, and moistens the burlap or other absorbent coating 85, the flow being such as to moisten substantially the whole of this coating all the way down to the bottom of the refrigerator. Assuming that the conduits 35, 36 (see also Figure 2 as well as Figure 11), are open to the outside air, it will now be appreciated that the circulation of outside air through the air space 30 will bring about a continuous evaporation of the moisture which is in the absorbent coating 85 and which is continuously supplied to the latter from the tank 80. This continuing evaporation has a substantial cooling effect on the immediately adjacent metallic (heat-conducting) wall 20, and consequently on the interior of the box. In this way, merely by replenishing the water supply in tank 80 from time to time, the interior of the box may be kept at a substantially lower temperature than that of the outside air or the inside of the building, and although the temperature may not be as low as in an ordinary refrigerator, a desirably cool storage place is provided, at least, comparable to a deep cellar or the like.

In some cases, the automatic thermostatic control for the dampers 45 in the inside air conduits, and likewise the automatic control for the dampers in the outside conduits 35, 36, may be dispensed with, and manual control devices provided instead. A convenient arrangement of such manual control devices is shown in Figure 11, and is in general mechanically similar to that shown in Figures 7 to 10 inclusive. In the case of the damper 45, the device includes a slidable arm or bar 90, having a notch 91, and adapted to receive on its upper surface and in the notch, a roller 92 carried by an arm 93 which is secured to the shaft 46 of the damper, for rotating the latter. The arm or bar 90 conveniently extends through the front of the cabinet, as shown, terminating in a suitable knob or handle 94. It will now be seen that when the knob 94 is pushed in, the damper 45 is closed, but upon pulling out the knob 94 the roller 92 falls into the notch 91, and the latter then engages the roller to move the arm 93 about the axis of shaft 46, thus rotating the damper 45 to open position.

A like arrangement, having an operating arm 100, extending into the interior of the box and terminating in a like knob 104, may be provided for similarly controlling a damper 61 in the outside air passage 35. It will be understood that identical control arrangements, not shown, are provided for the lower conduits 44, 36, as for the upper ones 43, 35, illustrated in Figure 11. It will now be appreciated that the manual control means, such as shown in Figure 11, may be readily operated, during cold weather, to prevent overcooling the box and thus, in effect, to keep its temperature at or above a predetermined minimum. For example, on moderate days, when the outside temperature is not substantially below this minimum, the dampers 45 will be kept closed, and dampers 61 open. In somewhat colder weather, the dampers 45 may be opened from time to time, conveniently whenever a reading of a thermometer inside the box indicates the necessity for warming the latter; and when the outdoor temperature drops to a particularly low value, the dampers 61 may be closed.

It will be appreciated that among other possible modifications, other types of thermostatic controlling devices than those previously described may be employed, in some cases; or for example, either of the arrangements here shown in Figures 4 and 7, respectively, may be used for both inside and outside conduits. As previously explained, the outdoor temperature in many localities seldom drops below about 20° F., and under such circumstances, no dampers or controlling means may be required for the outside conduits 35, 36,—sufficient temperature control being then usually obtained from the heat of the air inside the building, as through the instrumentalities including conduits 43, 44. On the other hand, when the outdoor temperature is likely to be very low, the additional damper controls 61 are useful, including the thermostatic devices 70 which are preferably mounted, as shown, so as to be directly responsive to the temperature of the air circulating in the space 30 (although for some purposes the devices may be mounted elsewhere, as inside the box). It may be noted that constructions such as shown in Figure 7 contribute notably to free the box from excessive localized cooling action; e. g., even in very cold weather, the apparatus is well adapted, in cooperation with the warming action of the means including conduits 43, 44, to prevent the wall 20, and particularly its inside face, from being chilled to such point as to have deleterious drying action on the air inside the box.

It will thus be seen that the apparatus affords a simple and efficient storage box, which may be used during a considerable portion of the year to supplement, or indeed replace, the usual refrigerator, and which will provide effective storage of articles of food without danger of either freezing them or undesirably drying them out. For example, when freshly cooked meat, still warm, is placed in an ordinary refrigerator, the drying action of the latter is particularly objectionable, and may, after only a few hours, make the meat so dry as to render it unpalatable; but when such meat is placed in the present storage box, even when it is warm and thus most susceptible of evaporation, it will remain satisfactorily fresh for several days or more.

Thus in one instance, using an apparatus of the type shown in Figures 1 to 3, it was found that with an outside temperature of 29° to 34° F., and an inside (room) temperature of about 72° F., the temperature in the storage box was fairly constant between 44° and 50° over a test period of twenty-four hours. At the same time the humidity in the storage box had a substantially constant value of 75% during that entire period. On the other hand, comparison measurements made with a commercial type of mechanical refrigerator, in the same house and at a time just prior to the above-described test of the storage box, showed that whereas the temperature in the refrigerator was about 40° to 42°, its relative humidity was only about 45 to 50%—indicating a much more dry atmosphere than that in the storage box. Indeed, my experience has shown that the figures last stated represent an abnormally moist condition in such refrigerators, whereas the storage box invariably has a relative humidity of the order of that mentioned above (viz., 75%), or somewhat higher.

In accordance with the provisions of the patent statutes, I have herein described the principle of operation of my invention, together with the apparatus which I now consider to represent the most advantageous embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use within the scope of the appended claims.

I claim:

1. In storage apparatus, the combination, with an outside wall of a building having an outer wall portion, of a storage box mounted in said wall to face the inside of the building and having a heat-conducting rear wall disposed within the building wall and in spaced relation to the aforesaid outer wall portion to provide an air chamber between said outer wall portion and said rear wall of the box, and conduit means through the said outer building wall portion adjacent the top and bottom of the box respectively, for circulation of outside air vertically through said chamber to cool the box rear wall, said box having a heat-insulated front wall facing the interior of the building and said box having controllable conduit means at the top and bottom of the box respectively for controllable circulation of air from inside the building through the box and along its rear wall to prevent overcooling of the latter.

2. In storage apparatus, the combination, with an outside wall of a building having an outer wall portion, of a storage box mounted in said wall to face the inside of the building and closed against access of outside air but having a heat-conducting rear wall disposed within the building wall and in spaced relation to the aforesaid outer wall portion to provide an air chamber between said outer wall portion and said rear wall of the box, and adjustable conduit means comprising conduits through said outer building wall portion adjacent the top and bottom of the box respectively, for controllable circulation of outside air vertically through said chamber to cool the box rear wall, said box having insulating wall portions for insulating the interior of the box from the inside of the building, and said box having adjustable conduit means comprising conduits at the top and bottom of the box respectively for controllable circulation of air from inside the building through the box and along its rear wall, and means responsive to the interior temperature of the box, normally maintaining said conduit means closed against said circulation of inside air, but adapted to open said conduit means to initiate said circulation upon reduction of said temperature below a predetermined degree.

3. In storage apparatus, the combination, with an outside wall of a building, of a storage box mounted in said wall to face the inside of the building and closed against access of air from outside the building but having a heat-conducting rear wall disposed to be cooled by outside air substantially throughout its area, said box being mounted for access from inside the building but having insulating wall portions for insulating the interior of the box from the inside of the building, and said box having adjustable means comprising conduits for directing air from the inside of the building into the box and for circulating said inside air along and throughout substantially the entire inside surface of the said heat-conducting rear wall, whereby the interior of the box may be prevented from being overcooled and said cooled rear wall may be directly prevented from having undesired dehydrating action toward the interior of the box.

4. In a storage apparatus, the combination, with an outside wall of a building having an outer wall portion, of a storage box mounted in said wall to face the inside of the building and having a heat-conducting substantially vertical rear wall disposed within the building wall and in spaced relation to the aforesaid outer wall portion to provide a flue chamber between said outer wall portion and said read wall of the box, said flue chamber being substantially coextensive with said rear wall, and conduit means through the said outer building wall portion adjacent the top and bottom of the box respectively, for circulation of outside air vertically through said flue chamber.

ALFRED L. BROWNE.